(12) United States Patent
McDonough et al.

(10) Patent No.: US 8,013,840 B1
(45) Date of Patent: Sep. 6, 2011

(54) USER NOTIFICATION SYSTEM WITH AN ILLUMINATED COMPUTER INPUT DEVICE

(75) Inventors: Timothy A. McDonough, Kirkland, WA (US); Carl J. Ledbetter, Lynnwood, WA (US); Robert Scott Plank, Bellevue, WA (US); Steven W. Fisher, Bothell, WA (US); Steven T. Kaneko, Seattle, WA (US); Steven Bathiche, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2485 days.

(21) Appl. No.: 09/699,517

(22) Filed: Oct. 31, 2000

Related U.S. Application Data

(63) Continuation-in-part of application No. 09/544,110, filed on Apr. 6, 2000, now Pat. No. 6,486,873.

(51) Int. Cl.
*G09G 5/00* (2006.01)
(52) U.S. Cl. ...................................................... 345/163
(58) Field of Classification Search .................. 345/163, 345/165, 170, 172, 156, 158, 166; 715/701, 715/702; 382/313; 463/37
See application file for complete search history.

(56) References Cited

U.S. PATENT DOCUMENTS

| | | | |
|---|---|---|---|
| 3,892,963 A | 7/1975 | Hawley et al. | |
| 4,409,479 A | 10/1983 | Sprague et al. | |
| 4,847,484 A | 7/1989 | Kikuchi | |
| 4,922,060 A | 5/1990 | McJunkin | |
| 5,001,467 A | 3/1991 | Chien | |
| 5,119,077 A | 6/1992 | Giorgio | |
| 5,186,629 A * | 2/1993 | Rohen | 434/114 |
| 5,363,120 A | 11/1994 | Drumm | |
| 5,428,369 A | 6/1995 | Pranger et al. | |
| 5,457,480 A | 10/1995 | White | |
| 5,463,387 A | 10/1995 | Kato | |
| 5,517,211 A | 5/1996 | Kwang-Chien | |
| 5,574,479 A | 11/1996 | Odell | |
| 5,574,480 A | 11/1996 | Pranger et al. | |
| 5,689,715 A * | 11/1997 | Crump et al. | 345/771 |
| 5,692,956 A | 12/1997 | Rifkin | |

(Continued)

OTHER PUBLICATIONS

ELFSystems-Shareware Developers. IdiotLight98 http://www.elfsystems.com/, May 23, 2000, 4 sheets selected pages.

*Primary Examiner* — Abbas Abdulselam
(74) *Attorney, Agent, or Firm* — Merchant & Gould

(57) ABSTRACT

A user notification system and a computer input device, such as a mouse. The computer input device includes an illumination member that enables a user to quickly and accurately position the input device during poor lighting conditions and determine whether the computer is ON. The input device includes a housing and an illumination device that is supported by the housing. Illumination from the illumination device is visible when the input device is placed on a supporting surface. The illumination member is also used to notify the user if one or more of various events have occurred in a computer application being run on the computer. The notification information is presented to the user by changing the state of the illumination member. An example of event for notification includes the receipt of a message in a communications program such as an e-mail message. The notification can make the illumination member blink as a function of the number of messages received. This enables information to be conveyed to the user without the need for text or audio, and without the need to view the computer monitor.

17 Claims, 6 Drawing Sheets

U.S. PATENT DOCUMENTS

| | | | | |
|---|---|---|---|---|
| 5,764,224 | A | | 6/1998 | Lilja et al. |
| 5,841,425 | A | * | 11/1998 | Zenz, Sr. .................... 345/163 |
| 5,890,139 | A | * | 3/1999 | Suzuki et al. ................ 705/27 |
| 5,909,209 | A | | 6/1999 | Dickinson |
| 5,936,554 | A | * | 8/1999 | Stanek ........................ 341/22 |
| 5,999,166 | A | | 12/1999 | Rangan |
| 5,999,895 | A | * | 12/1999 | Forest ........................... 704/1 |
| 6,040,825 | A | * | 3/2000 | Yamamoto et al. ......... 345/173 |
| 6,052,563 | A | * | 4/2000 | Macko ......................... 340/7.1 |
| 6,072,391 | A | * | 6/2000 | Suzuki et al. ............... 340/468 |
| 6,088,516 | A | * | 7/2000 | Kreisel et al. ............... 709/221 |
| 6,199,996 | B1 | * | 3/2001 | Katrinecz, Jr. et al. ........ 362/85 |
| 6,212,265 | B1 | * | 4/2001 | Duphorne ................ 379/142.15 |
| 6,218,958 | B1 | * | 4/2001 | Eichstaedt et al. ............ 340/7.6 |
| 6,249,805 | B1 | * | 6/2001 | Fleming, III ................. 709/206 |
| 6,252,579 | B1 | * | 6/2001 | Rosenberg et al. ........... 345/856 |
| 6,334,103 | B1 | * | 12/2001 | Surace et al. ................. 704/257 |
| 6,337,678 | B1 | * | 1/2002 | Fish ............................. 345/156 |
| 6,353,926 | B1 | * | 3/2002 | Parthesarathy et al. ....... 717/170 |
| 6,360,221 | B1 | * | 3/2002 | Gough et al. ................. 707/10 |
| 6,366,300 | B1 | * | 4/2002 | Ohara et al. .................. 345/771 |
| 6,373,047 | B1 | * | 4/2002 | Adan et al. ................... 250/221 |
| 6,396,477 | B1 | * | 5/2002 | Hinckley et al. ............. 345/163 |
| 6,874,023 | B1 | * | 3/2005 | Pennell et al. ................ 709/224 |

* cited by examiner

USER NOTIFICATION SYSTEM WITH AN ILLUMINATED COMPUTER INPUT DEVICE

CROSS REFERENCE TO RELATED APPLICATION

This application is a continuation-in-part of U.S. patent application Ser. No. 09/544,110, filed Apr. 6, 2000 now U.S. Pat. No. 6,486,873, entitled Illuminated Computer Input Device.

TECHNICAL FIELD

The present invention relates to a computer input device having an illumination member and a system and method for controlling the illumination member. More specifically, the present invention relates to a notification method and system for controlling an illumination member on a computer input device based on an event, state or occurrence in a computer application.

BACKGROUND OF THE INVENTION

Modern computer systems are designed to receive input from a number of input devices including mice and trackballs. Both the mouse and the trackball control the cursor on a computer screen, and include keys for performing certain computer operations. Frequently, a mouse includes a ball mounted to the bottom of a housing. When the mouse is moved over a supporting surface, the ball movement is translated into distance and direction information, which is supplied to the computer. The cursor on the computer screen is moved in a direction and by an amount corresponding to the movement of the ball. The mouse may also include buttons or keys, which control particular operations on the computer. In another arrangement for the mouse, the mechanical ball tracking system is replaced with an optical tracking system to measure movement of the mouse with respect to the supporting surface.

A trackball device is also a common peripheral for computers and workstations. In a trackball device, the tracking ball is rotatably mounted to a part of the housing that is exposed when it is resting on a supporting surface. To operate the trackball device, the housing remains stationary on a supporting surface and the ball is moved relative to the housing by a user. Once again, the movement of the ball is translated to corresponding movement of the cursor on the computer screen. The trackball device typically includes buttons or keys, which control particular operations on the computer.

The conventional mouse may be difficult to efficiently use in conditions of low lighting or no lighting, since there is nothing to render the exact position of the mouse visible in these conditions. More particularly, in order to enhance the visibility of the information displayed on a computer screen and to reduce glare from the screen, computers are often operated in either low or no lighting conditions. Operations requiring the use of the mouse are typically performed periodically, therefore the user is frequently required to locate and orient the mouse to perform a particular operation. Although the mouse is usually arranged within reach of the user, it may be difficult to efficiently locate and orient the mouse with low or no lighting.

A similar problem exists with trackball devices. Users typically desire to locate the movable ball quickly without relying solely on tactile feedback. Accordingly, poor lighting conditions can make quick and accurate positioning of the user's hand on the trackball device or locating the trackball device inefficient.

Difficulty in quick and accurate locating of a mouse and/or trackball device can be more significant when the input devices are being used with certain computer programs. For example, certain programs may require the user to move his or her hand between a keyboard and the computer input device hundreds of times. Any efficiency gained in these repetitive movements may increase the user's efficiency with the program and may make such repetitive movements more tolerable.

Additionally, some computer users will accidentally turn off his or her computer monitor without turning off the central processing unit (CPU). When this occurs, there may be no indication that the CPU is still ON. While some CPUs may include a small light indicating that the system is ON, such a small light on the CPU may be difficult to see. As many CPUs are stored underneath desks, a small indicator light on a CPU may not serve as a casual, easily noticeable indicator providing information as to whether the system is ON or OFF.

Therefore, a mouse and a trackball device are needed which would enable a user to quickly and accurately locate and position the mouse and trackball device during conditions where there is reduced lighting or no lighting. Additionally, a device to provide an improved indication as to whether the computer is ON or OFF is also needed. The present invention was developed to accomplish these and other objectives.

Many computer communication systems, such as e-mail programs, are currently used. Some of these programs have notification features. Typically, with a notification feature of the program in an active mode, the receipt of an e-mail may cause an icon or user interface to appear on the display device or may cause the computer to produce an audible signal. However, such icons and visual indicators take up valuable display area, and both the visual and audible indicators can sometimes be annoying, even to the point where many users disable such features.

Further, many existing notification systems lose their effectiveness if a computer user leaves the area of his or her computer and later returns. When such a situation occurs, the user is unable to tell whether to engage the computer to read an e-mail or respond to a solicitation relating to a communications program. If there is no reason to engage the computer, the user typically wants to leave the computer untouched unless there is a reason to engage the computer. This is especially true when the computer is in a power saving mode or the monitor is far away and engagement is inconvenient. Additionally, with current visual display notification systems, the monitor needs to be powered ON to be notified of a receipt of an e-mail or other communication receipt. There may be some situations where users prefer to turn their monitors off when not being actively used and would still like to receive notifications. Most screen savers are disabled only upon a user input such as the user pressing a key on a mouse, trackball or keyboard or by moving a mouse or a ball on a trackball. Thus, most notification systems are ineffective when a screen saver is on. It would be advantageous to be able to have a notification system still be effective when a monitor is off or when a screen saver is running. Also, it would be advantageous to have a notification system that has a wide filed of view, so that it does not require users to orient themselves nor approach the device to see the notification. Therefore, an improved notification system was also needed.

SUMMARY OF THE INVENTION

In view of the foregoing, the present invention provides an improved computer input device that eliminates the deficiencies of the prior art.

The present invention also provides an improved computer input device that enables a user to more efficiently and accurately locate the device during reduced lighting conditions or no lighting conditions.

The present invention further provides an improved computer input device that enables a user to more efficiently and accurately position his or her hand on the device during reduced lighting conditions or no lighting conditions.

Further, the present invention provides an improved computer input device that illuminates the area proximate the device.

The present invention also provides an improved computer input device that indicates whether the computer is ON or OFF.

According to one aspect, the invention provides a computer input device having a housing that is configured to interface with a human hand, and an illumination device. The illumination device is coupled to the housing and is visible when the housing is placed on a supporting surface.

According to another aspect of the present invention, a computer input device includes a housing configured to interface with a human hand, and an illumination device. The illumination device is coupled to the housing and is visible when the housing is placed on a supporting surface. The illumination device can be used to illuminate the area proximate the computer input device.

According to yet another aspect of the present invention, a computer input device is provided which includes a housing configured to interface with a human hand, and an illumination device, which is coupled to the housing and is visible when the housing is placed on a supporting surface, where the illumination device indicates whether the computer is ON or OFF or whether an event has occurred in a computer application. In one aspect of the present invention, the illumination member on a track-mouse device is used to notify users of various occurrences or a status relating to applications being run on the computer. This enables the information to be conveyed to the user without the need for text or audio, and can be seen from wide angles and at a far distance. The notification information is presented to the user by changing the state of the illumination member. States of the illumination member can be changed in a number of different ways such as by blinking the light, or changing the color or intensity of the light. In another aspect of the present invention, a computer-readable medium having computer-executable instructions for performing various steps includes determining, in a computer, whether a predetermined event has occurred, and communicating with a computer input device having an illumination member to cause the illumination member to change states in response to the determining step.

In yet another aspect of the present invention, a method for controlling an illumination member on a computer input device includes determining, in a computer, whether a predetermined event has occurred, and changing a state associated with the illumination member in response to the determination step.

Further, in another aspect, a system includes a computer input device and a computer-readable medium. The computer input device includes a housing adapted to rest on a supporting surface. The housing has an upper body configured to interface with a human hand, and an illumination device coupled to the housing. The computer-readable medium has computer-executable components for performing steps including includes determining, in a computer, whether a predetermined event has occurred, and changing a state associated with the illumination member in response to the determination step.

These and other objects and features of the present invention will be apparent upon consideration of the following detailed description of preferred embodiments thereof, presented in connection with the following drawings in which like reference numerals identify like elements throughout.

DETAILED DESCRIPTION OF THE INVENTION

Figure 1:
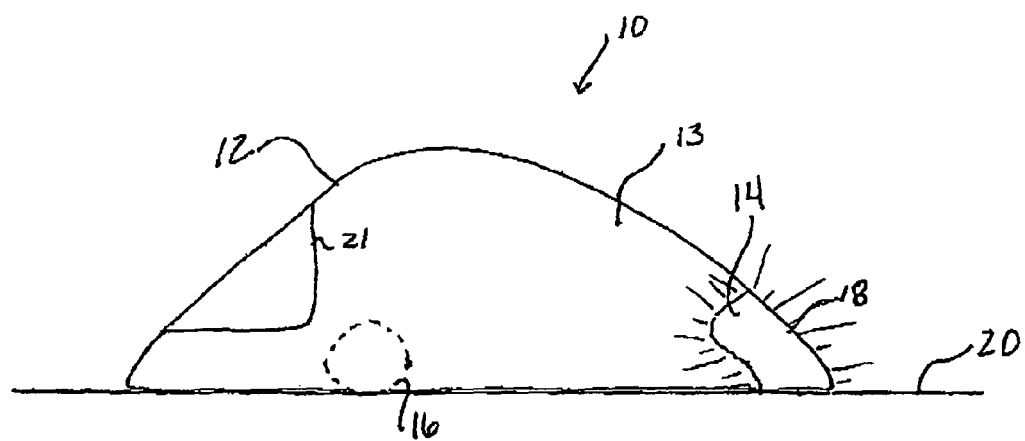
FIG. 1 is a side elevational view of a mouse type computer input device having a bottom-mounted movable ball and an illumination device of the present invention.
Figure 2:
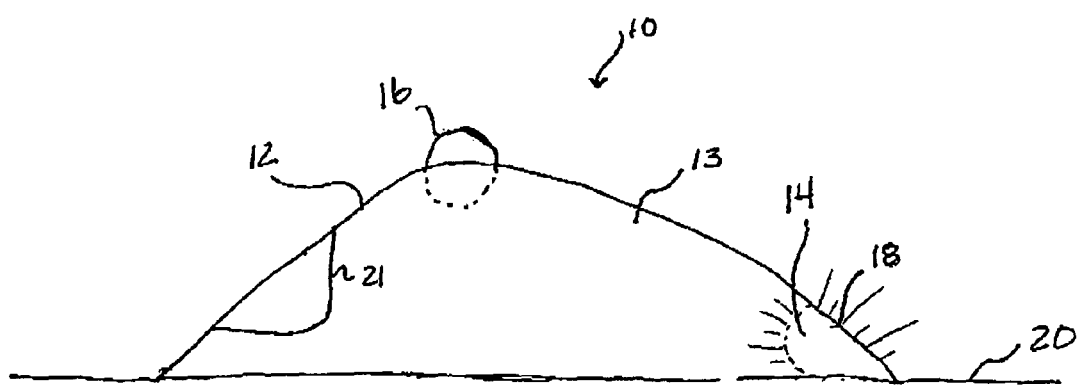
FIG. 2 is a side elevational view a trackball type computer input device having a top-mounted movable ball and an illumination device.

The term "mouse" is commonly used to refer to a computer input mouse design having a tracking system such as a lower mounted ball or an optical tracking system, for determining the relative movement between the mouse and a surface upon which it rests.

The term "trackball device" is commonly used to refer to a computer input device having a body and a rotatable ball coupled to the body for direct manual engagement by a user when the trackball device is resting on a supporting surface. The term "track-mouse device" as defined and used herein means a computer input device being a mouse or a trackball device.

The phrase "predetermined event" as used herein means an event associated with the operation of a computer application and excludes the normal powering on and off of the computer.

The phrase "communication application" as used herein means a computer application that enables text, video, or audio communication between different a user and at least one of another user, computer, or network of computers. Examples of communication applications include, but are not limited to, applications for enabling email communicating, voice mail communicating, facsimile communicating, video and/or audio conferencing, and instant messaging.

Referring to FIGS. 1-4, the track-mouse device is generally designated by reference numeral 10. The track-mouse device 10 transmits signals generated by a movement sensor and used to control a geographical pointer or a display of a computer system. The track-mouse device 10 preferably includes a housing 12 having a substantially flat bottom surface such that it is arranged to rest on a supporting surface 20. The housing 12 includes an upper body 13 shaped to interface with and preferably support the human hand. A movable ball 16 can either be rotatably mounted in the bottom of the housing 12, as shown in the mouse design of FIG. 1, or mounted in the top of the housing 12, as shown in the trackball design of FIG. 2. Movement of the rotatable ball 16 may be sensed by any conventional mechanical or optical sensing system, or by any other desired technique. For example, if a mechanical sensing system is used, the ball 16 may be supported on a pair of perpendicular rollers. If an optical sensing system is used, a light source may be reflected off of a non-exposed portion of the ball 16, and an optical sensor may determine the relative movement of the ball 16. As an alternative to a rotatable ball 16, the mouse type track-mouse device 10 may include an optical tracking device.

Figure 3:
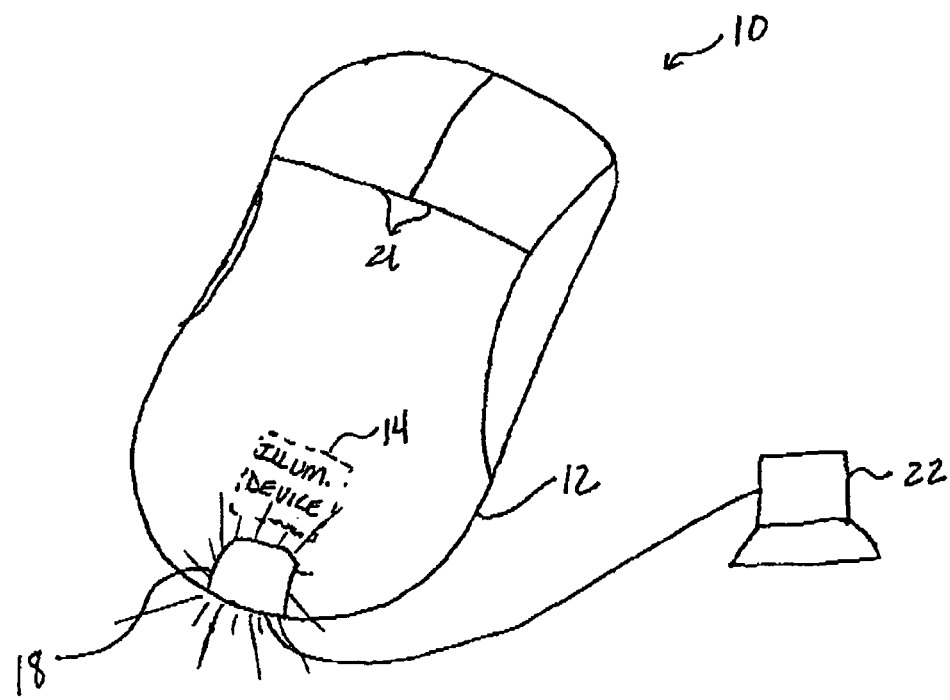
FIG. 3 is a perspective view of a computer input device coupled to a computer.
Figure 4:
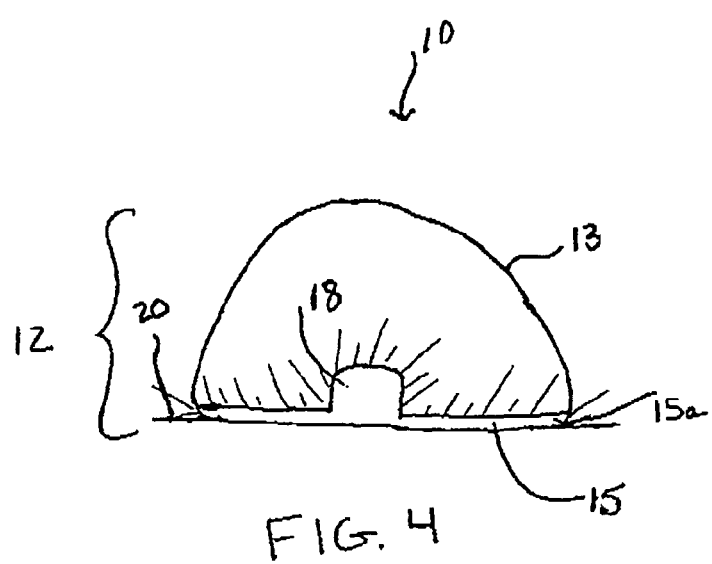
FIG. 4 is a rear elevational view of the computer input device of FIG. 3.

The track-mouse device 10 illustrated in FIGS. 3-4 employs a non-ball optical tracking device (not shown). The optical tracking system of the track-mouse device 10 of FIGS. 3-4, preferably includes a light source that may be directed at the supporting surface 20 through the bottom of the housing 12, and an optical sensor inside of the housing 12 that determines the relative movement between the supporting surface and the track-mouse device 10. Each of these tracking devices and methods as described herein are well known.

According to the present invention, the track-mouse device 10 further includes an illumination device 14, which is preferably separate from the tracking device and positioned inside of the housing 12. The illumination device 14 is arranged so that light from the illumination device 14 is visible when the track-mouse device 10 is placed on a supporting surface 20. In use, the track-mouse device 10 is connected to a computer 22 and provides signals to the computer 22 and can control a cursor or other object on a monitor. The computer 22 may be any one of many different designs. As one example of the many possible configurations and arrangements of devices that the track-mouse device 10 may transmit signals to, the computer 22 preferably includes a visual display device. The display, which may be a cathode ray tube type, active matrix display, or other suitable device, can display a cursor or pointer, along with text and other graphic information. The computer may also include storage or memory, a processor, and a keyboard.

Rays of light from the illumination device 14 enable a user to easily locate and orient the track-mouse device 10 during reduced lighting or no lighting conditions. More particularly, the illumination device 14 enables a user to quickly and accurately position his or her hand on the track-mouse device 10 in poor lighting conditions. The quick and accurate positioning of the track-mouse device 10 enables a user to efficiently perform computer operations. The illumination device 14 further enables a user to easily determine whether the computer is ON or OFF regardless of the lighting conditions. According to the present invention, the illumination device 14 of the track-mouse device 10 is arranged to illuminate the area proximate the track-mouse device 10 to assist a user in viewing materials proximate the track-mouse device 10 during reduced lighting or no lighting conditions. Power to light the illumination device 14 may be supplied via the cable attachment to the computer 22 or from a self-contained battery source. The illumination device 14 may be a light emitting diode (LED) or any other suitable illuminating element that renders the track-mouse device 10 visible in low lighting or no lighting conditions. The illumination device 14 may be a white or clear illumination source or a source that emits colored light. Any color light that facilitates visibility in reduced or no lighting conditions would be appropriate for the illumination device 14. For example, the light source may emit red light to facilitate visibility in poor lighting conditions. The illumination device 14 may also include multiple light sources emitting the same or different color light. Illumination may be emitted continuously or intermittently. The LED may also be a variable multicolored light source. The color and intensity as well as whether the light is to remain on consistently or intermittently may be programmable by any known method. For example, in one arrangement, signals from the computer based on a user's input can select preferences of these parameters. Referring to FIG. 3, the illumination device 14 is supported within the housing 12. Light emitted from the illumination device 14 is visible through the housing 12 when the track-mouse device 10 is placed on the supporting surface 20. More particularly, the housing 12 includes a window 18 through which light from the illumination device 14 is visible. Window 18 is either transparent or semi-transparent to allow light from the illumination device 14 to be visible. Window 18 may also be colored. For example, window 18 may be red. Additionally, window 18 may be arranged at any suitable location of the housing 12, so long as it enables light from the illumination device to be visible when the track-mouse device 10 is placed on the supporting surface 20. For example, window 18 may be arranged around keys 21 on the track-mouse device 10 and/or around the ball 16. Similarly, window 18 may be configured to form any of an infinite number of shapes. For example, window 18 may be configured to form the logo of a company or a company's name. It is noted that while the track-mouse device 10 shown in FIGS. 3-4 takes the form of a mouse, the same illumination systems and features exist in preferred embodiments for trackball devices.

Window 18 may be provided by the upper body 13 of the housing 12, as shown in FIG. 3, or provided by a generally horizontal base member 15, as shown in FIG. 4. Base member 15 may also include an outer peripheral surface 15a that is visible when the track-mouse device 10 is placed on the supporting surface 20. Window 18 may be arranged to extend from the outer peripheral surface 15a, as shown in FIG. 4. The outer peripheral surface 15a may be transparent or semi-transparent to enable light emitted by the illumination device 14 to radiate through the outer peripheral surface 15a. The base member 15 and the outer peripheral surface 15a may also be colored. The light radiating from the outer peripheral surface 15a may illuminate the area proximate the track-mouse device 10 to act as a light source to enable a user to view materials in the proximate area. In another arrangement, an illuminated bottom strip or base region similar to that shown in FIG. 4 may be formed by the upper body 13 in lieu of base member 15.

The transparent or semi-transparent portions of the track-mouse device 10 may be a specific color, multi-colored, or clear, so long as the light from the illumination device 14 is visible when the track-mouse device 10 is placed on an opaque supporting surface 20. In addition, any color combination for the transparent or semi-transparent portions and the illumination source can be used. The remaining portions of the housing 12 can be opaque.

It is recognized that the illumination device 14 may be arranged in any suitable position and manner that would render light emitted by the illumination device 14 visible when the track-mouse device 10 is placed on the supporting surface 20. For example, the illumination device 14 may be arranged to be flush with the outer surface of the housing 12. Moreover, the illumination device 14 need not be covered. The illumination device 14 may be exposed so that light from the illumination device 14 is directly visible. In addition, the entire upper body 13 may be transparent or semi-transparent.

According to the present invention, the track-mouse device includes an illumination device that is visible when the track-mouse is placed on a supporting surface. Light from the illumination device enables a user to quickly and easily locate and orient the track-mouse device when visibility is poor due to reduced lighting or no lighting conditions. In addition, the illumination from the illumination device may be bright enough to enable a user to view materials in the area proximate to the track-mouse device when used in reduced lighting conditions or no lighting conditions. Additionally, illumination from the illumination device of the track-mouse device enables a user to easily determine that the computer is ON, even when the computer and track-mouse device are in an area having reduced lighting, or no lighting at all.

Figure 5:
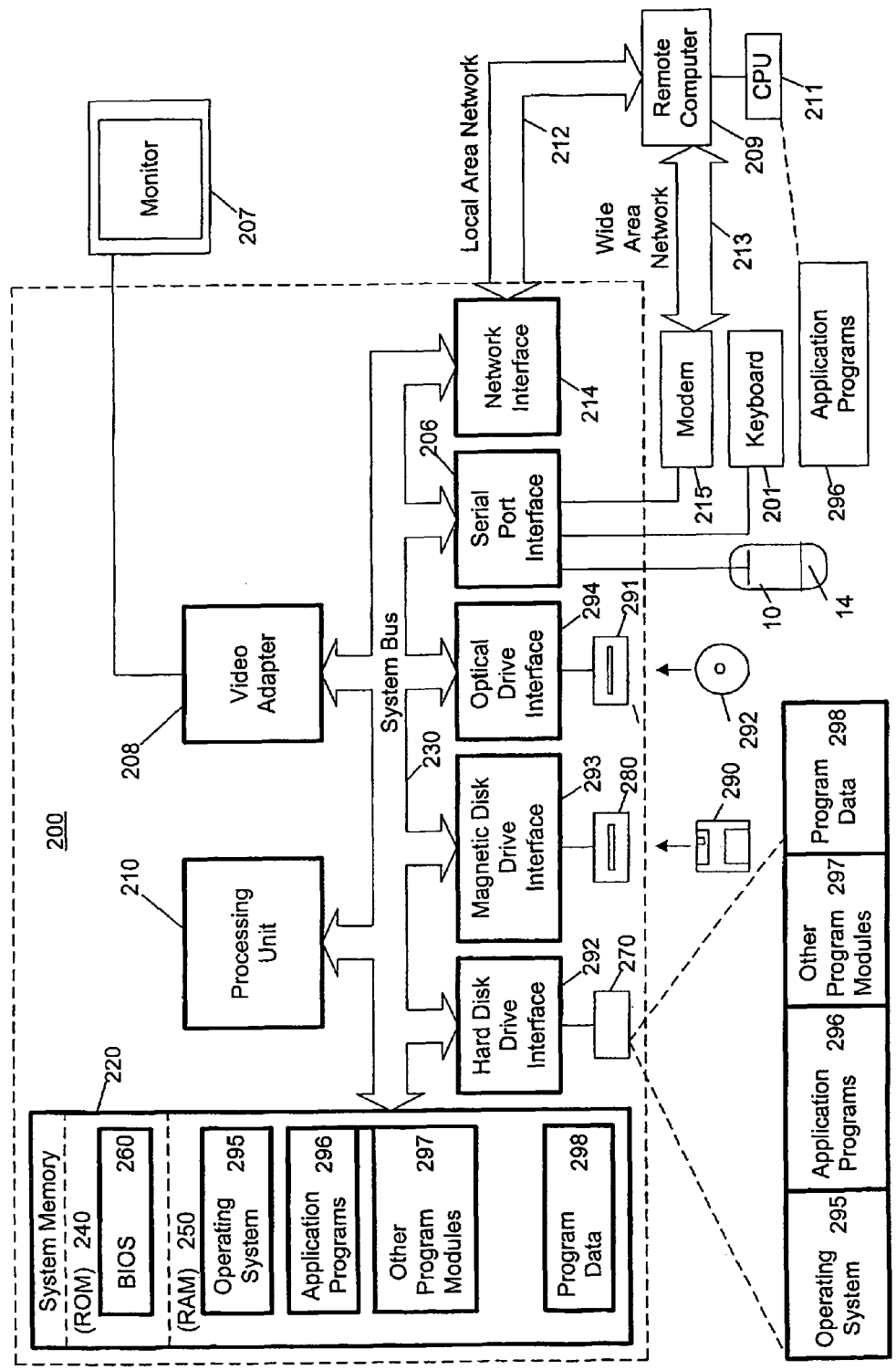
FIG. 5 shows a schematic diagram depicting a computing environment according to embodiments of the present invention.

FIG. 5 is a schematic diagram of a computing environment in which the track-mouse device of present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device. The pointing device is preferably an embodiment of the track-mouse device 10 as previously described. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 5. The logical connections depicted in FIG. 5 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

Figure 6:
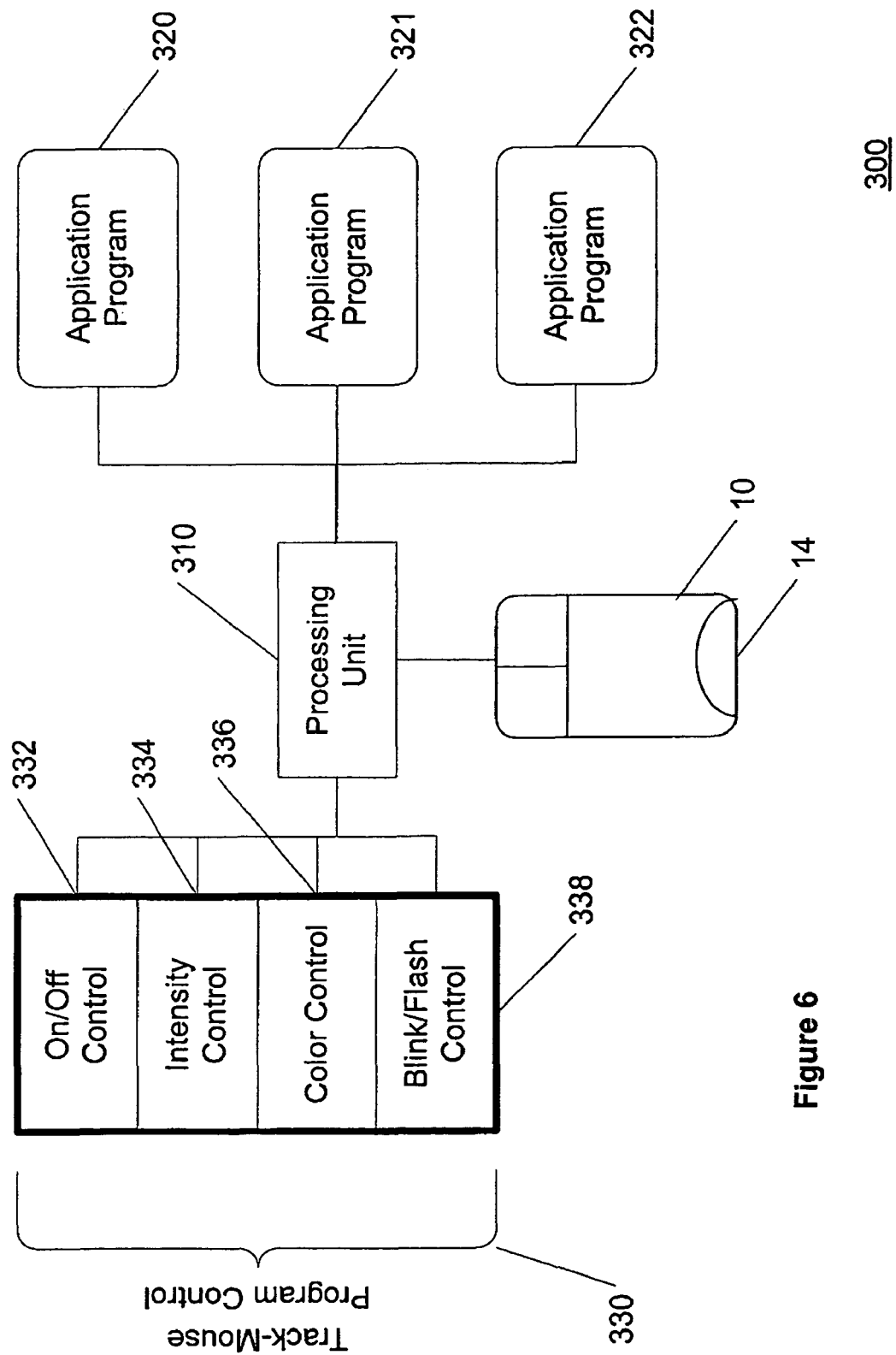
FIG. 6 shows a schematic diagram depicting a relationship between various computer application programs and the computer input device for controlling an illumination member on the computer input device.

In one arrangement, as shown in FIG. 6, the computer processing unit 310 may be coupled to a track-mouse control program 330 to control the "state" or "states" of one or more illumination devices 14 on the track-mouse device 10. Such states may include: (1) whether the illumination device 10 is ON or OFF; (2) the degree of illumination (i.e., the light intensity or amount of lumens) of the illumination device 14; (3) the color of the illumination device 14 (if the illumination device 14 is a multi-colored LED or other device permitting changes in color; and/or (4) the blinking or flashing of the illumination device 14 (and blinking or flashing sequences). These states may be affected by program routines 332, 334, 336, and 338 respectively. The control program 330 and its routines 332, 334, 336, and 338 may be separate programs or routines or part of any other program such as a driver for a mouse or a trackball. If more than one illumination device 14 is used on the track-mouse device 10, the state or states may be changed separately or simultaneously. If desired, the user can be given the option of overriding the changing of the states.

States for the illumination device 14 may be controlled by the computer 300 in response to an event or occurrence, a condition, or any other activity relating to an application 320-322 being run by the computer 300. While three such programs 320-322 have been shown, it is recognized that illumination device 14 may be controlled in accordance with any number of programs. Further, any desirable program or program type may be used to affect the states of the illumination device 14 on the track-mouse device 10. Settings and defaults for the states may be controlled through any desirable interface. For illumination purposes, power to the track-mouse device 10 can be controlled by supplying or not supplying power to achieve a normally on or off state, and can be periodically switched off or on, respectively, in response to a particular condition.

This arrangement enables an occurrence, a state, or any other activity relating to any other program 320-322 being run by the computer 300 to cause the illumination device 14 to change states. This may be advantageous in using a number of programs, for example, programs relating to communication, scheduling, education, or games.

For example, this arrangement may be advantageous for users using communication programs relating to e-mail, voice mail, facsimile, and various conferencing techniques. Thus, the illumination device 14 may change states (including turning on or off, blinking or flashing, changing colors, and/or varying in intensity) in response to the receipt of an e-mail, voice mail, or facsimile message. Further, as most of these programs identify the sender of a message, a comparison can be performed to see if the sender of the message is a predetermined user or a user from a predetermined list. Based on the results of such a comparison, the illumination device 14 may change states if the message was sent from a particular user or a user in a particular group.

Additionally, this arrangement can assist the user by indicating activity while he or she is away from the computer. For example, the illumination device 14 may be programmed to blink or flash or otherwise change states as a function of the number of messages that has been received since the user left the computer (which can be measured from the last entered computer input), or as a function of the number of messages that has been received and not read or opened. Thus, a user can be notified that he or she has received two messages in his or her absence when the illumination device 14 blinks twice in succession. The blinking may be timed between periods of being fully on or off. Similarly, many other programs that interact between multiple users include a solicitation feature. Such programs include communication software for chat rooms, instant messaging, and video and/or audio conference calls. The illumination device 14 on the track-mouse device 10 may change one or more states in response to the receipt of a solicitation to join a chat room, instant messaging, or a call. Additionally or alternatively, the illumination device 14 may change one or more states due to a notification that a user has entered a common program or system and is now capable of receiving a solicitation to join a chat room or call.

Further, alternatively or additionally, the illumination device 14 on the track-mouse device 10 may change states in response to calendar and/or scheduling programs. The relationship between the changing of one or more states and an item on the calendar or scheduling program may be set to be either instantaneous to the time or date or may be set to provide an advance warning of the set time and date. For example, if the user has a 3:00 p.m. conference to attend, the illumination device can be set to change states at 3:00 p.m. or prior to 3:00 p.m. Further, the activation time for the changing of states in response to an item may be set on an item-by-item basis. For example, a user could program the illumination device 14 to change states 24 hours in advance of an important date.

Further, the illumination device 14 on the track-mouse device 10 may also interface with other types of programs to change one or more states in response to conditions or occurrences in the program to notify users of almost anything. For example, if the program is an educational, trivia, or child development related game, the illumination device 14 can be an encouragement tool to change states in response to the entry of a correct answer. Additionally, if the program is an adventure game, the illumination device 14 may change states when a character enters a dangerous area or situation. It may change states when player has run out or is running out of a particular supply (e.g., food, money, or ammunition). It may change states in response to being in a given proximity with a desirable or undesirable object. Another alternative is to make the illumination device 14 blink or flash, with the number of blinks corresponding to the number of lives remaining.

Figure 7:
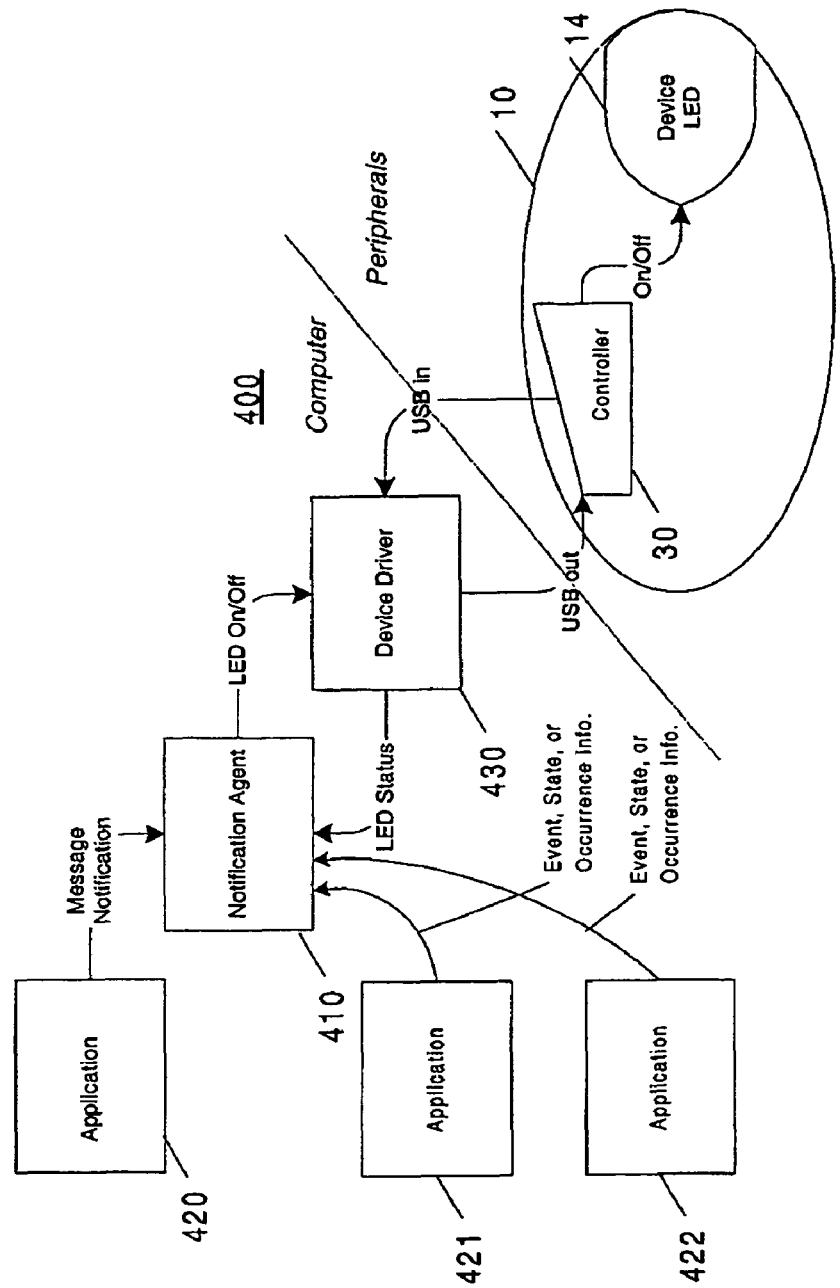
FIG. 7 shows an alternative schematic diagram depicting a relationship between various computer application programs and the computer input device for controlling an illumination member on the computer input device.

In an alternate configuration, as shown in FIG. 7, the computer 400 includes separate programs or routines for the input device driver 430 and the notification agent 410. These programs may be stored in a hard drive, or in a solid state memory, or downloaded from a network of computers, for example, from over the internet. In a manner known in the art, the track-mouse device 10 is coupled to the device driver 430. In a preferred arrangement, track-mouse device 10 is coupled to the device driver 430 via a Universal Serial Bus (USB) connection. The device driver 430 controls the "state" or "states" of one or more illumination devices 14 on the track-mouse device 10 based on events, and/or status or occurrence information relating to an application 420-422 derived or determined by notification agent 410. However, it is recognized that the notification agent 410 can be combined with the device driver 430 similar to the arrangement shown in FIG. 6.

The notification agent 410 may be referred to as the interface between the applications 420-422 and the computer input device driver 430 and determines events, occurrences, and status information relating to the applications 420-422 in any desired manner. Notification agent 410 interprets notification messages from specific applications 420-422 running on the computer 400. When a notification message is received, the notification agent 410 processes the messages and decides what instructions or commands to send to the device driver 430. The notification agent 410 will then send appropriate commands to the device driver 430 to change one or more of the states of the illumination member 14. The device driver 430 translates the control messages and sends the command over the Universal Serial Bus (USB) down to the device 10. The device 10 receives the message and executes the command that will affect the state of some type of the illumination member 14 on the device 10. In a preferred arrangement, the notification agent 410 makes use of a framework that enables a common mode of communication between applications. One commercially available product that furthers such a framework is called "ACTIVE X"® by Microsoft Corporation.

In one example, the notification agent 410 interfaces with an e-mail program type of application 420. The notification agent 410 communicates with the e-mail program application 420 via an interface. As example of a system employing such an interface, is one using a Microsoft "ACTIVE X"®, as previously mentioned, control to generate a notification message. When a new message is received, the notification agent 410 receives a trigger from the control and checks the number of new messages in the inbox of the e-mail program. The notification agent 410 changes the state of the illumination member 14 on the track-mouse device 10 for every new message by sending an appropriate command to the device driver 430. In one desirable arrangement, for every new message, the notification agent 410 causes the illumination member 14 to blink, either rhythmically or non-rhythmically. The user can glance at the track-mouse device 10 and note the number of new messages on the e-mail program application 420 by counting the number of times the mouse LED blinks. Examples of e-mail program applications are as Microsoft "OUTLOOK"™, Novell GROUPWISE, or Lotus NOTES, or any other electronic mail program that permits knowledge of the values in its fields or the existences of new messages. Alternatively, other communication systems may be used that generate similar messages. For example, other messaging system include instant messaging system from AOL and "MSN"™.

Figure 8:
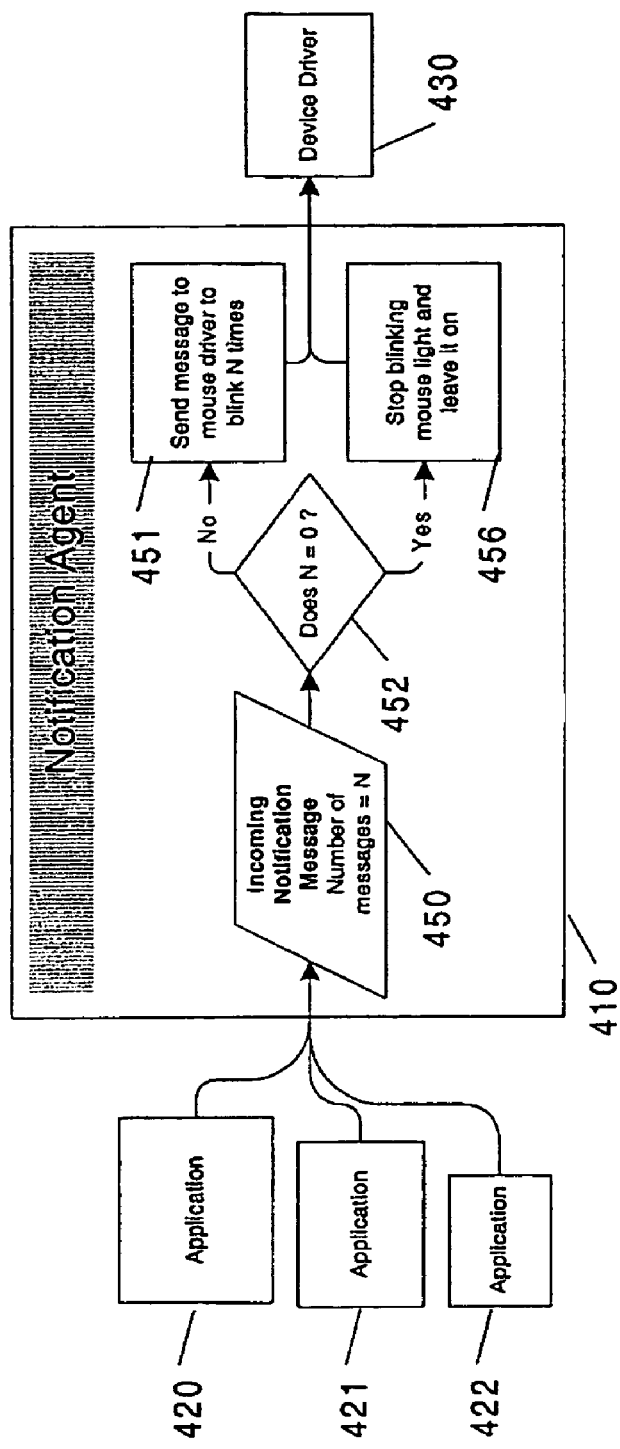
FIG. 8 shows a combined schematic diagram and flow chart of the notification agent.

In a preferred method, as shown in FIG. 8, the notification agent 410, at step 450, interfaces with a field in an e-mail application 420 to determine the number of received and unopened e-mail messages, and assigns variable N to have that number. That number is then compared to 0 at step 452. If that number is 0, then step 456 will occur and there will be no command to change the state of the illumination member 14. Thus, the state of illumination member 14 will remain at its default of being ON. However, it is recognized that the default can be OFF. When the N is not equal to 0, a command is sent to the device driver 430 to blink N times, at step 454. This may be accomplished, by doubling that number N, and changing the states that many times. number. That is, the ON/OFF state of the illumination member 14 is changed 2 N times. Thus, if N=1 and the illumination member 14 is in the default ON state, the notification agent 410 sends two signals: a first signal to change the state of illumination device 14 to OFF, followed by a second signal to change the state of illumination device 14 to ON. If the number of unopened received messages is three, N=3, the state of illumination device 14 will be changes six times to produce three flashes. Predetermined delay periods or pauses can be used. Between flashes and/or between flashing cycles to create a desired flashing effects. To turn the illumination member 14 ON and OFF, a program routine can start off with a variable equal to 2 N and decrease it by one each time through the cycle. When that variable is equally divisible by two, i.e., an even number, then a signal can be sent to turn the illumination member 14 ON, and when that variable is not equally divisible by two, i.e., an odd number, then a signal can be sent to turn the illumination member 14 OFF. An example of program code for accomplishing this method appears below:

```
Private Sub Form_Initialize( )
'register WM_USER commands with the Mouse driver
light_on=RegisterWindowMessage ("light_on")
light_off=RegisterWindowMessage ("light_off")
'get handle to the window of the mouse driver, to send message to.
hwndMouseDriver=FindWindow ("POINTEXE", "Pointer.exe Invisible Window")
result=PostMessage (hwndMouseDriver, light_on, 0, 0)
'Setup up Active X® control for Microsoft Outlook™
Set m_application=CreateObject ("outlook.application", "")
Set namespace=m_application.GetNamespace ("MAPI")
Set inbox=namespace.GetDefaultFolder (olFolderinbox)
'flash the light if there are unread messages in the inbox
If inbox.UnReadItemCount <> 0 Then
messages=inbox.UnReadItemCount*2
Timer1.Enabled=True
End If
End Sub
Private Sub m_application_NewMail( )
'this event triggers when new mail enters the inbox
'enable timers to set flash the mouse light
'depending on the number of new messages
Timer1.Enabled=False
messages=inbox.UnReadItemCount*2
result=PostMessage (hwndMouseDriver, light_off, 0, 0)
Timer1.Enabled=True
End Sub
Private Sub Timer1_Timer( )
'flash the mouse light the number of new messages,
'when done wait a predetermined amount of time to flash again
If messages <>0 And (messages Mod 2=0) Then
    result=PostMessage (hwndMouseDriver, light_on, 0, 0)
    'scroll_light (True)
    messages=messages—1
ElseIf messages <>0 And Not (messages Mod 2=0) Then
    result=PostMessage (hwndMouseDriver, light_off, 0, 0)
    'scroll_light (False)
    messages=messages—1
ElseIf inbox.UnReadItemCount <> 0 Then
    result=PostMessage (hwndMouseDriver, light_off, 0, 0)
    'scroll_light (False)
    Timer1.Enabled=False
    Timer2.Enabled=True
Else
    result=PostMessage (hwndMouseDriver, light_on, 0, 0)
    ' scroll_light (False)
    Timer2.Enabled=False
    Timer1.Enabled=False
End If
End Sub
Private Sub Timer2_Timer( )
'the pause between notification flashes
'after the pause check to see if
'the number of new messages has changed
    messages=inbox.UnReadItemCount*2
    Timer2.Enabled=False
    Timer1.Enabled=True
End Sub
Private Sub Form_Terminate( )
'leave mouse light on when the program ends
    result=PostMessage (hwndMouseDriver, light_on, 0, 0)
End Sub
```

While this is one method for blinking the illumination member 14, it is recognized that other methods may be used. Further, based on the level of detail and functionality of the device driver 430, a single command may be sent from the notification agent 410 to the device driver 430 which may be interpreted to make the illumination device 14 blink a single time or multiple times. Additionally, it is recognized that all or most of the functionality associated with the device driver 430 may be located in a controller 30 in the computer input device 10. If desired, the changing of states of the illumination device 14 may be programmed to cease upon a user input, such as the movement of a mouse-type computer input device relative to a supporting surface or upon the movement of a ball on a trackball-type computer input device, until the receipt of a subsequent message. The notification agent 410 may transmit a general command to the device driver 430 which interprets the command for the actual peripheral computer input device 10. Thus, it is not necessary that the notification agent 410 know which specific computer input device 10 is used. Further, the notification agent 410 may be a program written in any desirable computer language including, but not limited to, Visual Basic, C++, and JavaScript.

As previously described, such states may include: (1) whether the illumination device 10 is ON or OFF; (2) the degree of illumination (i.e., the light intensity or amount of lumens) of the illumination device 14; (3) the color of the illumination device 14 (if the illumination device 14 is a multi-colored LED or other device permitting changes in color; and/or (4) the blinking or flashing of the illumination device 14 (and blinking or flashing sequences). These states may be affected by program routines within the device driver and/or by program routines inside the track-mouse device. If more than one illumination device 14 is used on the track-mouse device 10, the state or states may be changed separately or simultaneously. If desired, the user can be given the option of overriding the changing of the states.

The device driver 430 can control the ON or OFF state and/or the blinking of the illumination member 14 by known signal modulation techniques. Alternatively, the device driver 430 may control the illumination member 14 via a USB connection, as is known in the art. In another arrangement, as shown in FIG. 7, the computer input device 10, e.g., the trackball or mouse, includes a controller 30 coupled to the device driver 430 and the illumination member 14. The controller 30 may be a microprocessor, circuitry, or any other suitable arrangement. In such an arrangement, the device driver 430 can send command signals to the controller 30 to change any of the states of the illumination member 14. The controller 30 recognizes such signals to change the state(s) of the illumination member 14.

As previously described, states for the illumination device 14 may be controlled by the computer 400 in response to an occurrence, a condition, or any other activity relating to any other program 420-422 being run by the computer 400. While three such programs 420-422 have been shown, it is recognized that illumination device 14 may be controlled in accordance with any number of programs. Further, any desirable program or program type may be used to affect the states of the illumination device 14 on the track-mouse device 10. Settings and defaults for the states may be controlled through any desirable interface. For illumination purposes, power to the track-mouse device 10 can be controlled by supplying or not supplying power to achieve a normally on or off state, and can be periodically switched off or on, respectively, in response to a particular condition.

This arrangement enables an occurrence, a state, or any other activity relating to any other program 420-422 being run by the computer 400. This may be advantageous in using a number of programs, for example, programs relating to communication, scheduling, education, or games.

The illumination member 14 enables the trace-mouse device 10 or any other computer input device to be used as an output device as well. The illumination member 14 can present information to the user relating to an application running on the computer. This presenting of information by changing the states of the illumination member 14 enables the user to be notified from various positions even when the monitor screen is at a bad angle.

If desired, more than one illumination member 14 may be used on the track-mouse device 10. The notification agent 410 and device driver 430 may be programmed to control the multiple illumination members 14 either by making each illumination member 14 correspond to a different application or by making the combination of the states of the illumination members notify various events. For example, if three illumination members are provided on the track-mouse device 10, each illumination member 14 could be designated to correspond with a particular program application 420-422. Thus, the changing of a state of the first illumination member would signify an event, state or occurrence in the first application 420. Similarly, the changing of a state of the second or third illumination member would signify an event, state or occurrence in the second or third application 421 or 422, respectively. Alternatively, if two illumination members 14 are used, the combination of illumination members 14 can be shared to designate various occurrences. For example, notification of the receipt of an email from a user on a pre-designated list can be represented by the changing of states of both illumination members 14, while notification of the receipt of an e-mail from a user not on a pre-designated list can be represented by the changing of states of only one illumination member 14. In another example, if the user is playing an adventure game, each illumination member 14 can designate a different event or occurrence. Thus, one illumination member 14 may change states when a character enters a dangerous area or situation. Another illumination member 14 may change states when player has run out or is running out of a particular supply (e.g., food, money, or ammunition). A third illumination member 14 may change states in response to being in a given proximity with a desirable or undesirable object. A fourth illumination member 14 can blink or change states with the number of blinks corresponding to the number of lives remaining.

While particular embodiments of the invention have been shown and described, it is recognized that various modifications thereof will occur to those skilled in the art. For example, this computer-readable medium and associate features, and the method of illuminating the light member need not be used on a track-mouse device, and can be used to control an illumination member on other personal computer peripherals, such as keyboards, game devices, and cameras. This uses the same concept to notify the user of a message or an application state without the use of the computer monitor. Therefore, the scope of the herein-described invention shall be limited solely by the claims appended hereto.

What is claimed is:

1. A computer-readable device having computer-executable instructions for performing steps comprising:
    (a) determining, in a computer, whether a predetermined event has occurred;
    (b) communicating with a computer input device having an illumination member to cause the illumination member to change states in response to the determining step; and
    (c) establishing a set of senders, wherein said determining step includes determining whether a sender of an incoming message is in the set, wherein said communicating step includes causing the illumination member to change intensity.

2. A method for controlling an illumination member on a computer input device, said method comprising:
    (a) determining, in a computer, whether a predetermined event has occurred;
    (b) changing a state associated with the illumination member in response to the determination step; and
    (c) establishing a set of senders, wherein said determining step includes determining whether a sender of an incoming message is in the set.

3. The method of claim 2, wherein the computer input device is a track-mouse device.

4. A method for controlling an illumination member on a computer input device, said method comprising:
    (a) determining, in a computer, whether a predetermined event has occurred; and
    (b) changing a state associated with the illumination member in response to the determination step,
    wherein said determining step includes determining whether an instant message has been received and determining whether an email message has been received,
    wherein said changing step includes changing the state associated with the illumination member to a first state in response to determining an instant message has been received and changing the state associated with the illumination member to a second state in response to determining an email message has been received.

5. The method of claim 4, wherein the first state and the second state are different states.

6. A method for controlling an illumination member on a computer input device, said method comprising:
    (a) determining, in a computer, whether a predetermined event has occurred; and
    (b) changing a state associated with the illumination member in response to the determination step, wherein said determining step includes determining whether a request to respond to one of a video conference call and an audio conference call has been received.

7. A method for controlling an illumination member on a computer input device, said method comprising:
(a) determining, in a computer, whether a predetermined event has occurred; and
(b) changing a state associated with the illumination member in response to the determination step, wherein said determining step includes determining whether a user is capable of receiving a solicitation.

8. A method for controlling an illumination member on a computer input device, said method comprising:
(a) determining, in a computer, whether a predetermined event has occurred; and
(b) changing a state associated with the illumination member in response to the determination step, wherein said determining step includes comparing a scheduled event time relative to an actual time set in the computer.

9. A method for controlling an illumination member on a computer input device, said method comprising:
(a) determining, in a computer, whether a predetermined event has occurred; and
(b) changing a state associated with the illumination member in response to the determination step, wherein said determining step includes determining whether a correct answer has been input.

10. A method for controlling an illumination member on a computer input device, said method comprising:
(a) determining, in a computer, whether a predetermined event has occurred; and
(b) changing a state associated with the illumination member in response to the determination step,
wherein said determining step includes determining one of a state, a characteristic, and a condition relating to a character in a game program,
wherein said changing step includes changing the state associated with the illumination member to a first state in response to determining a change in the state of the character in the game program, changing the state associated with the illumination member to a second state in response to determining a change in the characteristic of the character in the game program, and changing the state associated with the illumination member to a third state in response to determining a change in the condition of the character in the game program.

11. The method of claim 10, wherein said determining step includes determining whether the character is within a given proximity of an object.

12. The method of claim 10, wherein said changing step includes causing the illumination member to change states in a manner corresponding to a number of lives remaining for the character.

13. The method of claim 10, wherein said changing step includes causing the illumination member to change states in a manner corresponding to an amount of a supply for the character.

14. The method of claim 10, wherein said changing step includes causing the illumination member to change states in a manner corresponding to the character entering an area in the game program.

15. A method for controlling an illumination member on a computer input device, said method comprising:
(a) determining, in a computer, whether a predetermined event has occurred;
(b) changing a state associated with the illumination member in response to the determination step; and
(c) establishing a set of senders, wherein said determining step includes determining whether a sender of an incoming message is in the set, wherein said changing step includes causing the illumination member to change intensity.

16. A method for controlling an illumination member on a computer input device, said method comprising:
(a) determining, in a computer, whether a predetermined event has occurred; and
(b) changing a state associated with the illumination member in response to the determination step, wherein said determining step includes determining whether a request to respond to a solicitation to join a chat room has been received.

17. A computer-readable device having computer-executable instructions for performing steps comprising:
(a) determining, in a computer, whether a predetermined event has occurred;
(b) communicating with a computer input device having an illumination member to cause the illumination member to change to a first state in response to determining that the predetermined event corresponds to receipt of a new email message;
(c) communicating with the computer input device having the illumination member to cause the illumination member to change to a second state in response to determining that the predetermined event corresponds to receipt of a new instant message; and
(d) communicating with the computer input device having the illumination member to cause the illumination member to change to a third state in response to determining that the predetermined event corresponds to input of a correct answer.

* * * * *